(No Model.) 4 Sheets—Sheet 1.
J. E. PITRAT.
WEIGHING AND PRICE SCALE.
No. 385,005. Patented June 26, 1888.
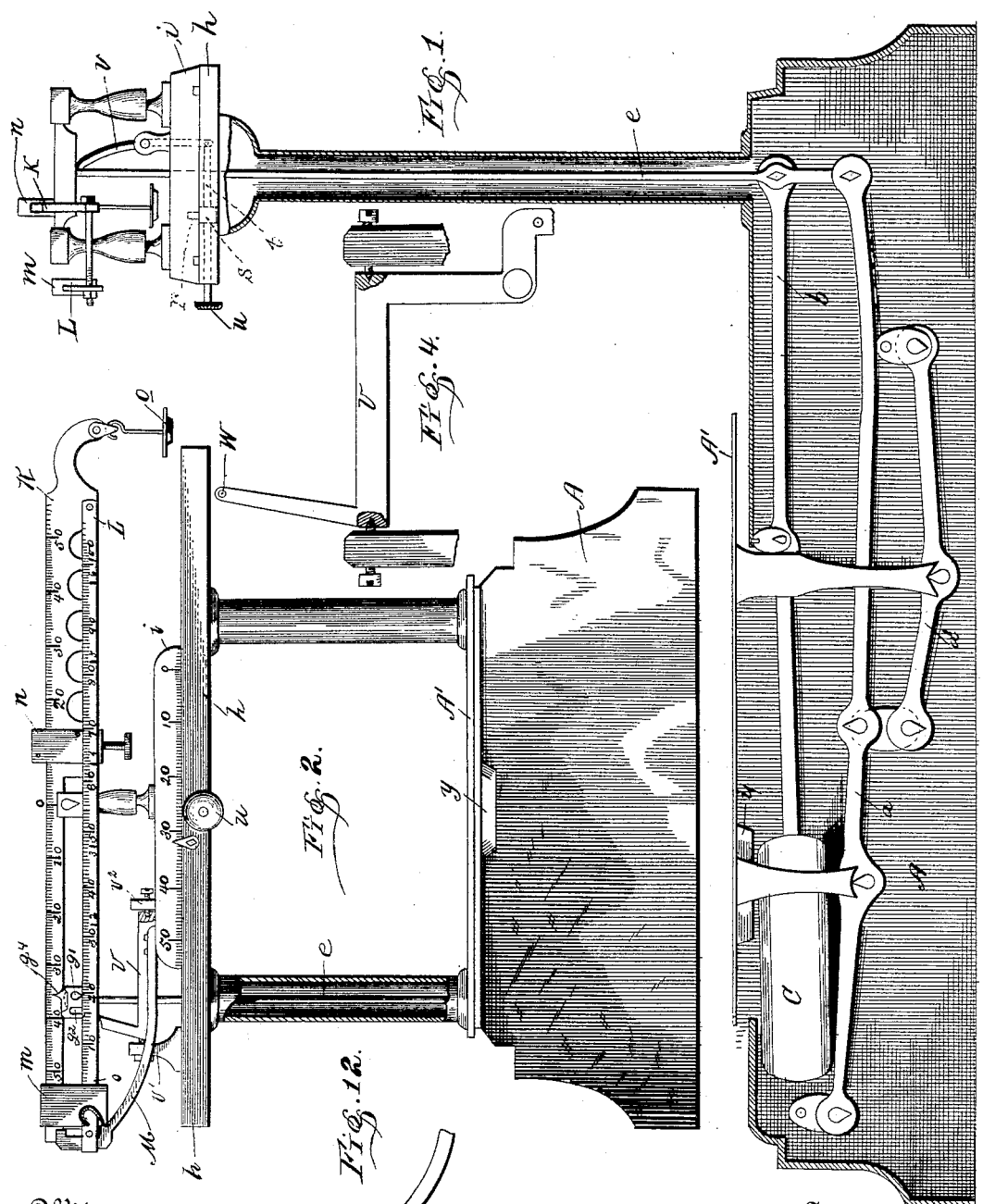

(No Model.) 4 Sheets—Sheet 2.
J. E. PITRAT.
WEIGHING AND PRICE SCALE.
No. 385,005. Patented June 26, 1888.
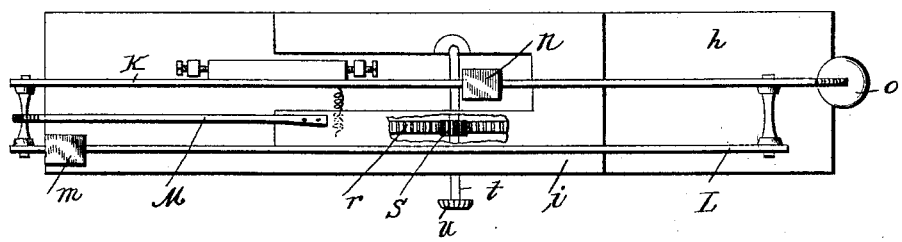
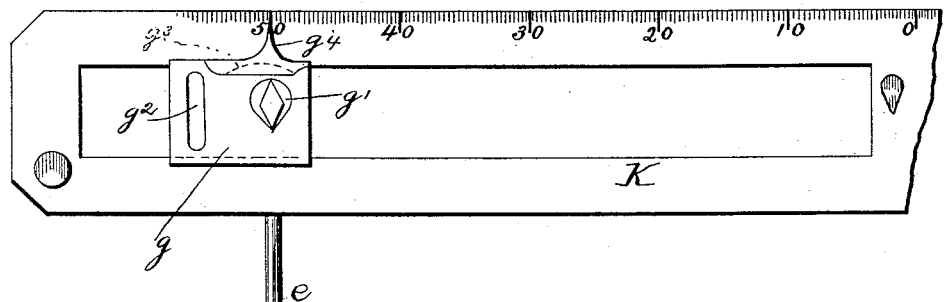
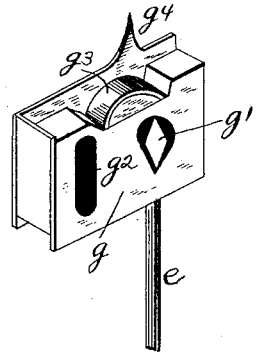
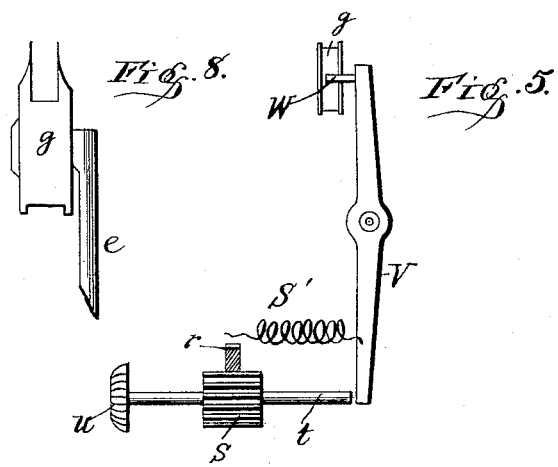
Witnesses.
R. C. Lauris
Van Buren Hillyard
Inventor.
Julius E. Pitrat.
By his Attorneys
R. S. & A. P. Lacey (No Model.) 4 Sheets—Sheet 3.

J. E. PITRAT.
WEIGHING AND PRICE SCALE.

No. 385,005. Patented June 26, 1888.

Witnesses.
R. C. Laurie,
Van Buren Hillyard.

Inventor,
Julius E. Pitrat.
By his Attorneys
R. S. & A. P. Lacey.

(No Model.) 4 Sheets—Sheet 4.
J. E. PITRAT.
WEIGHING AND PRICE SCALE.

No. 385,005. Patented June 26, 1888.

Witnesses.
R. C. Laurie
Van Buren Hillyard

Inventor.
Julius E. Pitrat
By his Attorneys
R. S. & A. P. Lacey

UNITED STATES PATENT OFFICE.

JULIUS E. PITRAT, OF GALLIPOLIS, OHIO.

WEIGHING AND PRICE SCALE.

SPECIFICATION forming part of Letters Patent No. 385,005, dated June 26, 1888.

Application filed May 20, 1887. Serial No. 238,872. (No model.)

*To all whom it may concern:*

Be it known that I, JULIUS E. PITRAT, a citizen of the United States, residing at Gallipolis, in the county of Gallia and State of Ohio, have invented certain new and useful Improvements in Weighing and Price Scales; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to weighing and price scales, and has for its object to provide a simple, convenient, compact, and efficient scale of the type above noted, which will be durable, economical, easy to manage, and not liable to get out of repair.

Weighing and price scales as generally constructed are comparatively heavier than weighing-scales simply of corresponding size and capacity, owing to the additional beams and weights. Now these additional beams and weights impose an unnecessary load upon the platform-levers.

One of the objects of the present invention is to take this load off of the said levers without interfering with their free action.

Another object of the invention is to adapt the platform of the scales to be used with or without a scoop, the scoop having a fixed position when in use relative to the platform by fitting in an opening therein, and when not in use the weight of the scoop is compensated for by a counterbalancing-weight which closes the said opening in the platform. The base carrying the beams is adjustable on the arm of the platform-scales, which arm in this class of scales is called a "sub-base," for adapting it to the rate or price per unit of the article to be weighed. In making such adjustments it is desirable to have the connecting rod remain in a fixed relative position, and also to have the adjustments effected in an expeditious manner.

A further object of my invention is to devise a simple and efficient means for positively engaging with said connecting-rod to hold it against movement in the direction of travel of the beams, while at the same time it serves to effect the adjustments of the base on which the beams are mounted.

The improvement consists, chiefly, in the novel features hereinafter more fully set forth and claimed, and shown in the annexed drawings, in which—

Figure 1 is a side elevation, one side of the base and column being removed, of a scale embodying my invention; Fig. 2, a front elevation of the scale; Fig. 3, a top plan view of the scale-beam and its supporting-base; Fig. 4, a detail front view of the cross head retaining-lever for holding the sliding head or block firmly while the scale-beam is adjusting; Fig. 5, a detail view showing the relative position of cross head retaining-lever, pinion, shaft, and spring for retaining and normally holding the lever in position; Fig. 6, a detail view of the left branch of the price-beam and block sliding within and along the slot therein; Fig. 7, a detail perspective of the connecting-rod and head-block, showing the presser-spring in place and the index-pointer; Fig. 8, an end view of the parts shown in Fig. 7; Fig. 9, a perspective view of additional dollar-weights; Fig. 10, isolated plan view of platform-levers and compensating lever; Fig. 11, plan view of platform showing hole to receive a lid or compensating weight for the scoop when the latter is not in use; Fig. 12, a detail view of the upper end of the support or bow limiting the stroke of vibration of beam and the transverse bolt uniting the ends of the main and supplemental beams; Fig. 13, a detail view of a modified form; Fig. 14, a plan view of the preferred form of price-scale and appurtenances; and Fig. 15 is a side view of the scale shown by Fig. 14.

In carrying out my invention I provide the base or shell A containing the levers $a\ a'$ with the platform A' for receiving the substance to be weighed. These levers may vary in form and have their pivots placed at suitable points to obtain any desirable multiplication of power. In addition to the said levers, (and unlike any of the other platform-scales,) I provide an extra lever, $b$, carrying a weight, C, at the one end, while the opposite end engages pivotally with the rod $e$, which connects the lower levers, $a\ a'$, with the left branch of price-beam K above. The object of this weighted lever $b$ is to act as a counterpoise to levers $a\ a'$, the platform $A'$, the removable lid $y$, the connecting-rod $e$, and the cross-head or block $g$.

The connecting-rod $e$ is pivotally attached to the sliding block or cross-head $g$ in any desired manner, and for the purpose two ways are shown. The one consists in having the rod $e$ provided at its upper end with a knife-edged hook, which enters and rests transversely within an opening, $g'$, in the side of the block $g$. The other consists in securing the upper end of the rod $e$ in the lower end of the bail or stirrup E, depending from the pivots $E'$, projecting from the sides of the block $g$. (See Fig. 15.) In the first instance the block $g$ will be provided with the vertical mortise or slot $g^2$, whose office will be hereinafter explained, and the said block is provided with a spring, $g^3$, placed between and seated in a recess therein and the under edge of the upper branch of the beam K; and it is also provided with a pointer or pointers, $g^4$, (one on each side,) projecting toward the graduation above. The base or shell at its rear end is provided with two uprights or columns which support a shelf or sub-base, $h$, upon which rests the base $i$ of the price-beam K, which slides to and fro and is directed in its travel by grooves in sub-base $h$.

The price-beam K may be of any approved form, and is provided at its center with the knife-edged pivot supported by two uprights mounted on the base $i$.

Figs. 6 and 15 show the left branch of the side beam, K, slotted to receive the cross-head or sliding block $g$, which is provided with the top and bottom flanges to embrace the sides of the beam and hold the cross-head and beam from lateral displacement.

Figs. 2 and 6 show the beam K graduated regularly near its upper edge, the said graduation numbering from center to the ends, and, for convenience, indicated by tens. The beam K receives two transverse bolts, (one at each end,) which support a supplemental beam, L, which receives two sets of graduations, (see Fig. 2,) the upper one being indicated by tens and terminating at one hundred, running from left to right, the other indicating pounds and fractions thereof, and this supplemental beam is placed sufficiently far forward from the front upright bearing to allow the sliding to and fro and the passing by of the bob-weight $m$; and the main beam on its right branch receives the tare-weight $n$ and at its end receives the depending weight-carrier $o$, upon which may be placed additional weights $p$, representing the value in dollars, when necessary.

The base $i$ supports the bent rod or bow M, whose upper end, engaging with one of the transversal bolts, serves to limit the stroke or vibration of the beam K, and the said base $i$ may be provided with a set of regular graduations corresponding with that of the left branch of the main beam, and to the sub-base is fixed an index, $e'$, pointing up to the graduation of the base $i$.

To facilitate the moving to and fro of the base $i$, carrying beams K and L, over the sub-base $h$, the former is provided at its under side with rack $r$, which is engaged by the pinion $s$, keyed on shaft $t$, journaled in the sub-base $h$. This shaft is rotated by a crank or knob, $u$, on its outer end, and the price-scales may be moved to the right or left by means of the said pinion shaft and rack.

Figure 10:
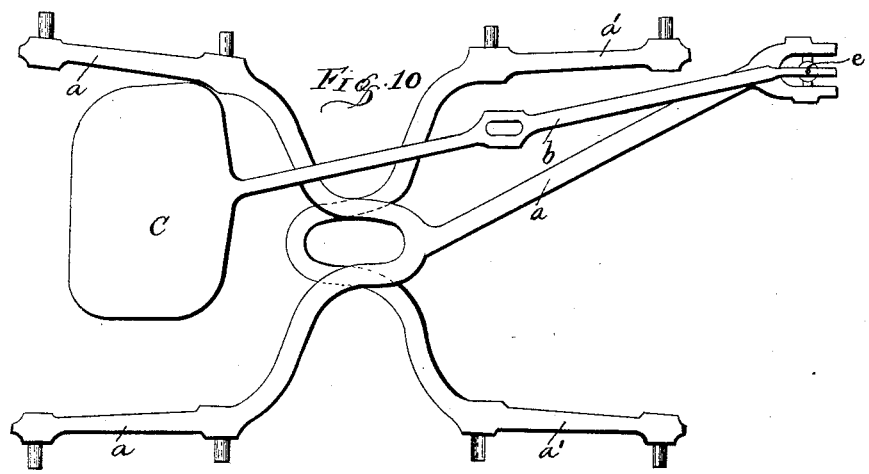
Figure 11:
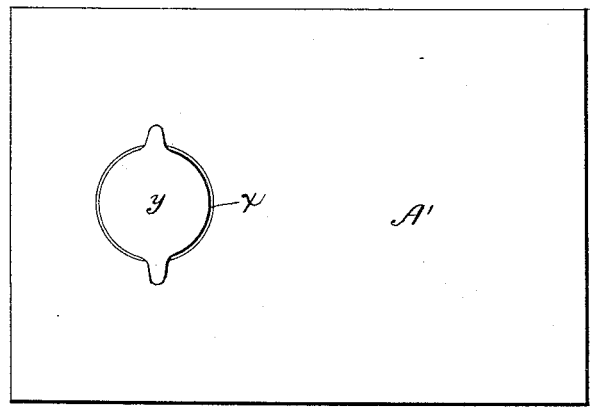
Figure 13:
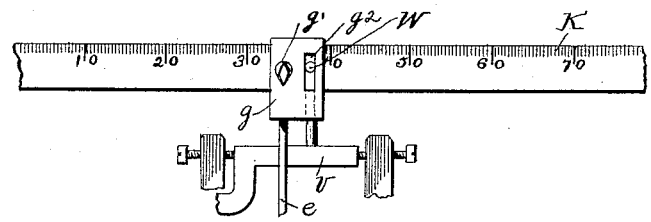
Fig. 13 shows a form in which the block is slotted lengthwise and is mounted upon the beam and slides thereon.
Figures 14, 15:
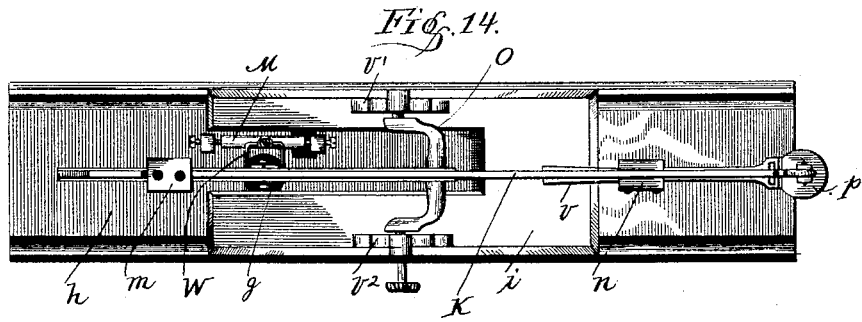

The shaft $t$ has a longitudinal movement in its bearings, and by pushing the rod $u$ the inner end of the shaft is made to bear against the lower branch of the cross-head retaining-lever V and force the upper end thereof, carrying the block or cross-head engager W, inward for holding the sliding block when the price-scales are adjusted or moved to and fro. The lever has lateral projections, which are engaged by two pivots, preferably pointed and adjustably supported by two uprights, $v'\ v^2$, mounted on the sub-base $h$. The engager W may be a pin, as shown most clearly in Figs. 4 and 5, in which case, when forced inward, it will enter the slot $g^2$ of the head-block $g$ and hold it steadfast while the base $i$ and beam K are being moved to and fro, or it may be U-shaped, as shown in Figs. 14 and 15. In this case the parallel arms will embrace the sides of the head-block and hold it firmly while adjusting the price-scales. The base $i$, together with the devices supported thereon, is moved by turning the shaft $t$, and the head-block is held fast by pressing the shaft inward, the pushing and turning of the knob being, of course, simultaneous, and the pushing being against the resistance of the spring $s'$, having one of its ends attached to the lever and the other to the sub-base $h$.

Near the front of the platform $A'$ is a hole or opening, $x$, which is closed by a lid, $y$, (much after the fashion of a stove lid.) This lid is of equal weight with that of a scoop, so that by moving the lid or compensating weight $y$ a scoop may be placed for use on the platform, and replacing the weight or lid when the scoop is off, the whole—i. e., the platform and levers, the rod and its head-block—always remain in perfect balance, because of the counterpoise-lever C.

While in some cases it may be advantageous to have the main and supplemental beams in different vertical planes, as shown most clearly by Figs. 1 and 3, yet for general use, simplicity and economy of construction, and compactness of arrangement, it has been found expedient to devise the construction and arrangement shown in Figs. 14 and 15, which show the main and supplemental beams in the same vertical plane, and the one above the other. By this construction the two beams can be readily made integral and the weight is equally distributed on the two pivotal supports, and the tendency of the beam to tip sidewise is obviated. The pivotal support O is bow-shaped, thereby allowing the head-block to reach the center of the beam or come in line with the pivotal supports, which permits computation to be made at the lowest desired rate per pound—a thing not attainable by the construction first described.

The U-shaped engager W dispenses with the slot $g^2$ in the head-block, which can accordingly be made shorter, thereby allowing the disposition of the rod $e$ so that the weight or load will come centrally upon the head-block; and by having the upper end of the rod rigidly fastened to the lower end of the bail, instead of having the rod $e$ terminating in the knife-edged hook and fitted in the V-shaped opening $g'$ in the head-block, a more accurate and reliable point of rest for the load is secured, which is rendered all the more reliable by the spring interposed between the block and the edge of the beam. The upper beam is graduated from left to right—from 0 to 100—and the graduation is indicated by tens below this set of graduation, which is the money-value graduation; and preferably between the upper and lower edges of the beam is a second row of graduations indicating pounds and fractions of pounds, the ounces and fractions of ounces being indicated by the degrees of the upper row of graduations. Near the lower edge of the left branch of the beam is a third row of graduations, indicating the rate or price per unit of the article to be weighed, numbering from the center to the end, 0 being at the center; and on the right branch, near the upper edge of the lower or supplemental beam, is a row of graduations corresponding to the rate or price per unit-graduation of the left branch and numbering from the center to the end in a similar manner. The bob-weight $m$ is placed upon and slides on the upper beam, and the tare-weight $n$ is mounted on the right branch of the supplemental beam.

The operation is as follows: Having had care to see that the tare-weight $n$ be at zero and there made fast by set-screw, place the index $g^4$ of the head-block $g$ to the degree (on the left hand of the price-beam) corresponding with the price per unit of bushel or pound. This placing is readily effected by first pressing on or pushing the knob $u$ until the engager W comes in contact with and fixes the position of the block $g$, and at the same time turning the knob one way or the other until the index reaches the point desired. Now let go the knob and the spring under the base will cause the head-block to be released and permit using the price-beam in the usual way—that is, the substance being placed on the platform, slide the bob-weight along the front bar until the beam balances, and also place therefor additional dollar-weights on the depending carrier, if needed. If, on the contrary, it was desired to deal out a certain amount (money value) of an article at a given price, you could place the price-beam to have the index rest on the degree indicated by the said price, the weighing-bob $m$ of the supplemental beam at the amount wanted, and supply the merchandise to the scale until the beam balances; but if it is desired to use the scales for weighing simply, slide the upper part of the device—the price-beam—so the index will rest at number 16 of the graduation, and make use of the lower set of graduation on the front bar, which is indicated in pounds and fractions thereof.

To more fully comprehend the workings of the scale, especially the operation of the bob-weight $m$, it must be observed that the beam K is provided at each end with a weight, the weight-carrier $o$ being at one end and the bob-weight $m$ at the other end. The position of the weight-carrier $o$ is relatively fixed and exactly counterbalanced by the bob-weight $m$ when the said bob-weight $m$ is at zero. Now when the bob-weight $m$ is brought nearer the center of the beam, or toward its fulcrum, obviously, the equilibrium of the beam K is destroyed and the left branch grows proportionately lighter as the bob-weight $m$ approaches the fulcrum of the beam K. To compensate for this lack of weight on the left branch of the beam K, weight must be supplied to the platform, which will be readily understood. Now by properly graduating the beam and proportioning the relative weights of the bob $m$ and the carrier $o$ any desired quantity may be accurately weighed. When the bob-weight $m$ is to the left of the fulcrum of the beam K, it acts against the weight-carrier $o$, and when to the right of the said fulcrum it acts with the said weight-carrier $o$. The weight of the cross-head $g$, the connecting-rod $e$, the platform-levers $a$ and $a'$, and the platform A' is perfectly counterbalanced by the weight C, so that they do not exert the slightest force to disturb the equilibrium of the beam K, no matter what may be its position relative to the sub-base $h$. Thus the beam will work freely in all positions and register correct amounts. When the index $g^4$ comes opposite 16 of the graduation, the scales may be used for ordinary weighing by pounds and ounces, because at this position the scales are adjusted to a unit of standard measure—sixteen ounces to the pound.

Having thus described my invention, what I claim, and desire to secure by Letters Patent, is—

1. The combination, with the platform-levers and the price-beam, of the head-block, and the connecting-rod interposed between and connecting the platform-levers directly with the head-block of the price-beam, substantially as and for the purpose described.

2. The combination, with the platform-levers, the price-beam, the head-block carried by the price-beam, and the rod directly connecting the platform-levers with the head-block, of the head-block retaining-lever, and mechanism, substantially as described, for simultaneously operating the lever and moving the price-beam.

3. The combination, with the platform-levers, the price-beam, the head-block, and the rod pivotally connected at its upper end with the head-block and at its lower end with the said platform-levers, of the head-block retaining-lever, the U-shaped engager carried by the upper end of the lever, and mechanism, substantially as set forth, for simultaneously operating the price beam and actuating the lever.

4. The combination, with the price-beam and the head-block having a vertical slot, of the retaining-lever and engager carried thereby and adapted to enter the slot, substantially as and for the purpose described.

5. The combination, with the price-beam and the head-block having a transverse opening and a vertical slot, of the rod $e$, having a knife-edged hook fitted in the transverse opening, and the retaining-lever provided with an engager adapted to enter the vertical slot, substantially as and for the purpose described.

6. The combination of the price-beam, the head-block mounted on the said beam, the spring interposed between the end of the head-block and the edge of the beam, the rod $e$, pivotally connected with the head-block, and the retaining-lever provided with the engager, substantially as described, for the purpose specified.

7. The combination, with the sub base, the price-beam mounted on a base and the head-block, of the retaining-lever having lateral projections between its ends, the uprights, and the pivotal supports, substantially as and for the purpose described.

8. The combination, with the sub-base of the price-beam mounted on a base, and the head-block, of the retaining-lever pivotally supported between its ends on the sub-base, the engager carried by the upper end of the retaining-lever, and the spring connecting the lower end of the retaining-lever with the sub-base, substantially as set forth.

9. The combination, with the sub-base, the retaining-lever and the price beam, and the base having a rack on its under side, of the shaft journaled in bearings in the sub-base and free to have a longitudinal motion in said bearings, and having its inner end bearing against the lower end of the retaining-lever, and the pinion keyed to the shaft and always in mesh with the rack, substantially as set forth.

10. The combination, with the platform-levers, the price-beam, the base carrying the price-beam, and the head-block provided with the index or pointer, of the rod connecting the head-block and the said platform-levers and the retaining-lever, substantially as and for the purpose described.

11. The combination, with the platform having multiplying-levers, the price-beam, and the rod connecting the platform-levers with the price-beam, of the weight-counterbalancing lever located in the said platform and connected with the said rod, substantially as and for the purpose described.

12. The combination, with the price-beam having its left branch slotted, of the head-block having the rod $e$ pivotally connected therewith and mounted in said slot, whereby the pivotal supports of the beam and rod $e$ may be brought into alignment, as and for the purpose described.

13. The combination, with the price-beam and the platform levers of the platform provided with a scoop receiving opening, of the lid or compensating weight for closing said opening, substantially as set forth.

14. The combination, of the main and supplemental beams connected together, the one beam having two rows of graduations extended from left to right, the one set of graduations indicating the value and the other set of graduations indicating pounds or units of weight, and the other beam graduated from the center toward each end, representing the rate per unit and the tare of the bob-weight placed on the beam graduated from left to right, the tare-weight placed on the right branch, and the head block mounted on the left branch of the other beam, substantially as and for the purpose described.

15. The combination, with the sub-base and the two uprights, of the price-beam composed of a main and supplemental beam in the same vertical plane, and the arch or bow shaped pivotal support, the main beam having two rows of graduations extending from left to right, and a third row of graduations extending from the center toward the end, and the supplemental beam having a row of graduations corresponding with the third row on the main beam, and extending from the center toward the opposite end of the beam.

In testimony whereof I affix my signature in presence of two witnesses.

JULIUS E. PITRAT.

Witnesses:
ALFRED F. MOORE,
C. C. PITRAT.